United States Patent
Tremblay (10) Patent No.: US 11,454,484 B1
(45) Date of Patent: Sep. 27, 2022

(54) MEASUREMENT SYSTEM

(71) Applicant: Steven Tremblay, Fiskdale, MA (US)

(72) Inventor: Steven Tremblay, Fiskdale, MA (US)

(*) Notice: Subject to any disclaimer, the term of this patent is extended or adjusted under 35 U.S.C. 154(b) by 0 days.

(21) Appl. No.: 17/220,502

(22) Filed: Apr. 1, 2021

Related U.S. Application Data (60) Provisional application No. 63/003,390, filed on Apr. 1, 2020.

(51) Int. Cl.
*G01B 3/1071* (2020.01)
*G01B 3/00* (2006.01)

(52) U.S. Cl.
CPC .......... *G01B 3/1071* (2013.01); *G01B 3/004* (2013.01); *G01B 2003/1074* (2013.01)

(58) Field of Classification Search
CPC .................. G01B 3/1071; G01B 3/004; G01B 2003/1074
See application file for complete search history.

(56) References Cited

U.S. PATENT DOCUMENTS

| | | | |
|---|---|---|---|
| 4,106,201 A | 8/1978 | Hansen | |
| D259,706 S | 6/1981 | Smith | |
| D260,738 S | 9/1981 | Smith | |
| 5,001,843 A | 3/1991 | Chapin | |
| 5,546,671 A * | 8/1996 | Kehoe | E04F 21/0076 33/760 |
| 5,551,613 A | 9/1996 | Malinowski | |
| 5,848,481 A * | 12/1998 | Parsons | G01B 3/1071 33/484 |
| D443,215 S | 6/2001 | Croya et al. | |
| 7,020,978 B1 * | 4/2006 | Nelson | B43L 7/005 33/759 |
| 7,062,859 B1 * | 6/2006 | Revnell | B43L 13/20 33/430 |
| 7,191,530 B1 * | 3/2007 | Thibodeaux | G01B 3/1071 33/759 |
| D551,996 S | 10/2007 | Armendariz | |
| 7,703,715 B2 * | 4/2010 | Kinugasa | B65H 37/007 242/588.6 |
| 8,091,250 B1 * | 1/2012 | Jinks | G01B 3/1056 33/758 |
| 8,209,874 B1 * | 7/2012 | Tribble | G01C 15/06 33/286 |
| 9,234,733 B2 * | 1/2016 | Sampson | G01B 3/1084 |
| 9,651,348 B2 | 5/2017 | French et al. | |
| 11,300,395 B1 * | 4/2022 | Story | G01B 3/1071 |
| 2015/0219430 A1 * | 8/2015 | Sampson | G01B 3/1084 33/761 |
| 2018/0328704 A1 * | 11/2018 | Kennedy | G01B 3/566 |

FOREIGN PATENT DOCUMENTS

JP 2021020810 A * 2/2021

* cited by examiner

*Primary Examiner* — Yaritza Guadalupe-McCall
(74) *Attorney, Agent, or Firm* — Cramer Patent & Design, PLLC; Aaron R. Cramer (57) ABSTRACT

A tape measure holder comprises a C-shaped clip having an adhesive disposed upon at least one interior face of the clip configured to removably secure a length of measuring tape upon the exterior surface of an object to be measured.

19 Claims, 6 Drawing Sheets

MEASUREMENT SYSTEM

RELATED APPLICATIONS

The present invention is a continuation of U.S. Provisional Application No. 63/003,390 filed on Apr. 1, 2020, the entire disclosures of which are incorporated herein by reference.

FIELD OF THE INVENTION

The present invention relates generally to measurement system including a measuring tape holder capable of mounting to a work surface for subsequent measurement and marking thereof.

BACKGROUND OF THE INVENTION

The proper tool for the job is a time-tested cliché that still rings true. Many times, using the right tool on a given task can make the task much easier, wither in measurements of time, money saved, ease-of-use, or accuracy. Sometimes, there are instances where the right tool does not exist, and it becomes necessary to invent one.

In the present case, measuring roofing framing elements on site is a timely but necessary event. Often times, this require the use of a tape measure and a marking device and is many times performed at elevated heights on a ladder. When marking roofing elements like joists, rafters, and studs with the layout tape, it is imperative that accurate markings be made. A typical method includes running the layout tape along the framing element and marking at specific intervals, then moving to another location along the same framing element, while carrying the materials up and down the ladder or scaffolding. Leaving the layout tape unattended on the framing element is dangerous as it may fall, or it may slightly move due to vibrations of the construction process or accidental bumping, thereby making the measuring process start over again and take longer. It is thus a benefit of the present invention to provide a means to hold the tape measure on the framing element and enable the means to travel along the framing element.

SUMMARY OF THE INVENTION

To achieve the above and other objectives, the present invention provides for a measurement system which has a tape holder which in turn has a holder front portion with a first side and a second side, a holder first side portion which extends rearwardly and perpendicularly away from the first side of the holder front portion, and a holder second side portion extending rearwardly and perpendicularly away from the second side of the holder front portion. The measurement system also has a framing element which has a bracket with a plurality of upper edges, the tape holder is mounted on the bracket of the framing element, a reel of tape which is disposed on the tape holder, a cutter which tears the tape, a roller rotatably attached to a plurality of front apertures disposed on the holder first side portion and the holder second side portion to help advance and flatten the tape as it is being dispensed, and a pair of tabs disposed immediately rearward of the roller.

Each of the pair of tabs are aligned with each other and extend inwardly from the holder first side portion and the holder second side portion. The reel of tape includes a tape dispersed from the reel of tape onto the framing element. The cutter is disposed at a terminal front bottom and attached to the holder first side portion and the holder second side portion. The holder front portion may have at least one window enabling visual identification of a remainder amount of the tape. The holder first side portion and the holder second side portion may be identical in shape and oriented parallel with each other. Each of the holder first side portion and the holder second side portion may have a flange that perpendicularly extends inward. The tape holder and the bracket may each be separate and interlocking. The tape holder may be made out of an inert and resilient material. The tape holder may be made out of a material to withstand repeated uses selected from the group consisting of plastic, stainless steel, or aluminum. The framing element may be 2 inches high and 4 inches wide or 2 inches high and 6 inches wide. The width of the bracket may be five-and-five-eighths inches. The upper edges may be conjoined by a bridging planar bracket first embodiment center portion. A center front portion of the bracket may include a slot sized to permit pivoting motion of the tape holder when it is attached to the bracket.

Upstanding from an upper portion of the rear corners of the slot are a pair of mounting ears. Each of the pair of mounting ears may have an aperture to permit the passage of a pin therethrough. The pin may be intended to removably mount the tape holder to the ears. The reel may be rotatably mounted to the flanges oriented between the holder first side portion and the holder second side portion and located at the rear top thereof. The pair of tabs may assist in guiding the tape towards the roller and the cutter. The measurement system may also comprise a pair of vertically-aligned rear apertures located on a bottom of the holder first side portion and the holder second side portion, subjacent to the reel. The rear apertures may receive the pin when the tape holder is mounted to the ears of either bracket embodiment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 measurement system
20a bracket first embodiment
20b bracket second embodiment
21a bracket first embodiment first side portion
21b bracket second embodiment first side portion
22a bracket first embodiment second side portion
22b bracket second embodiment second side portion
23a bracket first embodiment center portion
23b bracket second embodiment center portion
24 pin
25 slot
27 ear
30 tape holder
31 holder first side portion
32 holder second side portion
33 holder front portion
34 window
35 flange
36 roller
37 cutter
38 tab
39a rear aperture
39b front aperture
40a tape first embodiment
40b tape second embodiment
40c tape third embodiment
40d tape fourth embodiment
41 first tape mark
42 second tape mark
43 third tape mark
45 reel
50a first framing element
50b second framing element

DESCRIPTION OF THE INVENTION

The best mode for carrying out the invention is presented in terms of its preferred embodiment, herein depicted within FIGS. 1, 3, 5, and 6a, with alternate embodiments depicted in FIGS. 2, 4, and 6b-6d. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Figure 1:
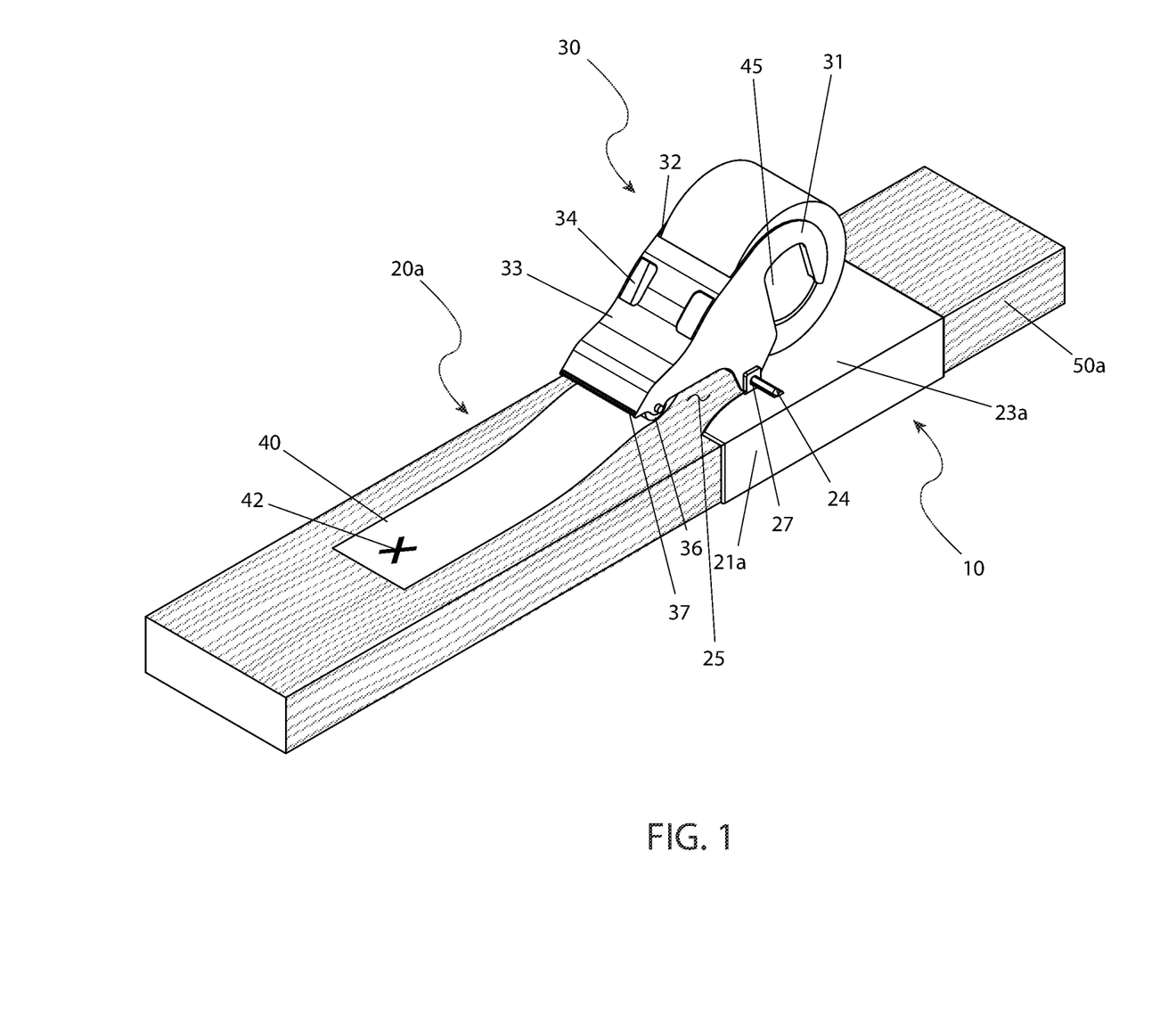
FIG. 1 is an environmental perspective view of a measurement system, including a tape holder mounted to a bracket first embodiment that is mounted on a first framing element, according to the preferred embodiment of the present invention.
Figure 2:
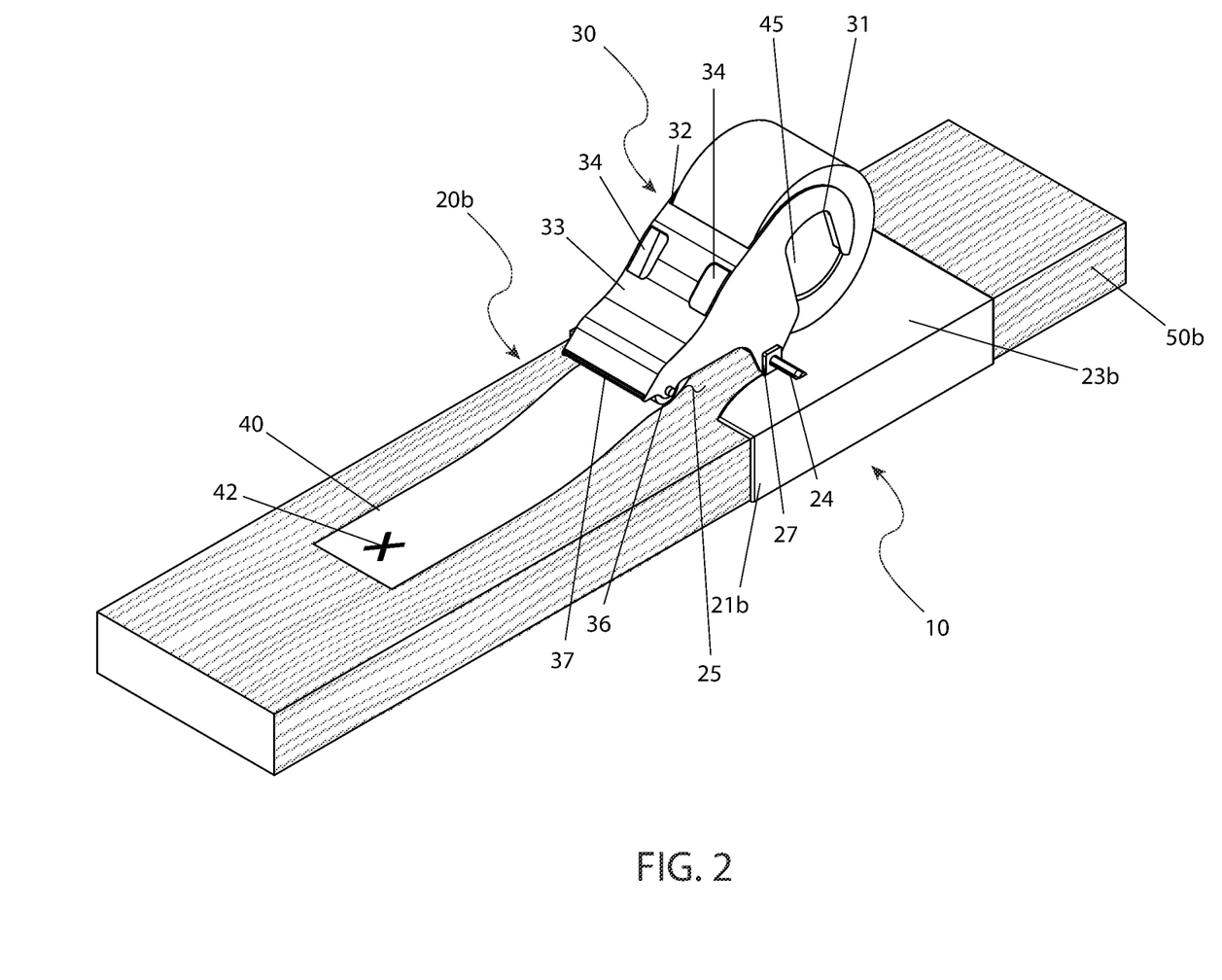
FIG. 2 is an environmental perspective view of a measurement system, including the tape holder mounted to a bracket second embodiment that is mounted on a second framing element, according to an alternate embodiment of the present invention.

Referring now to FIG. 1, a perspective view of a measurement system 10, which includes a tape holder 30 mounted to a bracket first embodiment 20a on a first framing element 50a. The tape holder 30 and bracket first embodiment 20a are each separate and interlocking elements and are preferably manufactured out of an inert and resilient material, such as plastic or stainless steel or aluminum to withstand repeated uses. FIG. 2, illustrates a perspective view of the tape holder 30 mounted to a bracket second embodiment 20b on a second framing element 50b. The bracket first embodiment 20a and bracket second embodiment 20b are relative similar in shape and features except for width. The bracket first embodiment 20a is particularly sized and shaped to fit on a first framing element 50a that resembles a two by four inch (2×4 in.) framing element. The bracket second embodiment 20b is particularly sized and shaped to fit on a second framing element 50b that resembles a two by six inch (2×6 in.) framing element. The tape holder 30 holds a reel 45 of tape 40a, 40b, 40c, 40d on to the desired framing element 50a, 50b to free the hands of the user in marking said framing element 50a, 50b for subsequent construction activities.

Figure 3:
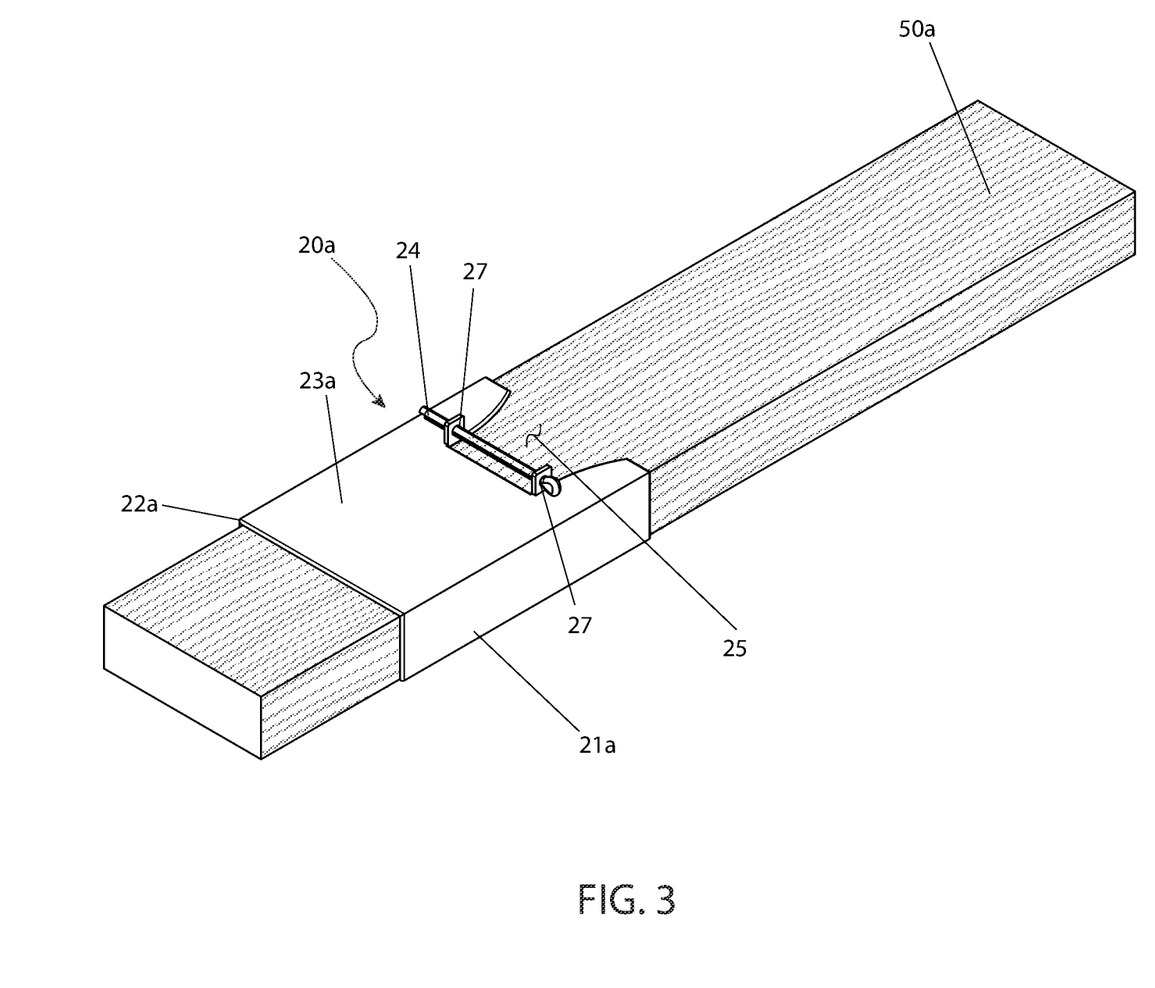
FIG. 3 is an environmental perspective view of the bracket first embodiment mounted on the first framing element with the tape holder removed, according to the preferred embodiment of the present invention.

FIG. 3 illustrates a bracket first embodiment 20a as it is installed on a first framing element 50a. The bracket first embodiment 20a includes a planar bracket first embodiment first side portion 21a and a planar bracket first embodiment second side portion 22a oriented parallel to each other and each preferably one inch (1 in.) in height. Upper edges of the bracket first embodiment first side portion 21a and bracket first embodiment second side portion 22a are conjoined by a bridging planar bracket first embodiment center portion 23a. In a preferred embodiment, the width of the bracket first embodiment center portion 23a is three-and-five-eighths inches (3⅝ in.) to accommodate the width of the first framing element 50a (e.g., a two by four inch (2×4 in.) framing element is typically approximately three-and-half inches (3½ wide). A center front portion of the bracket first embodiment center portion 23a includes a slot 25 sized to permit pivoting motion of the tape holder 30 when it is attached to the bracket first embodiment 20a. Upstanding from an upper portion of the rear corners of the slot 25 are a pair of mounting ears 27. Each mounting ear 27 has an aperture to permit the passage of a pin 24 therethrough. The pin 24 is intended to removably mount the tape holder 30 to the ears 27.

Figure 4:
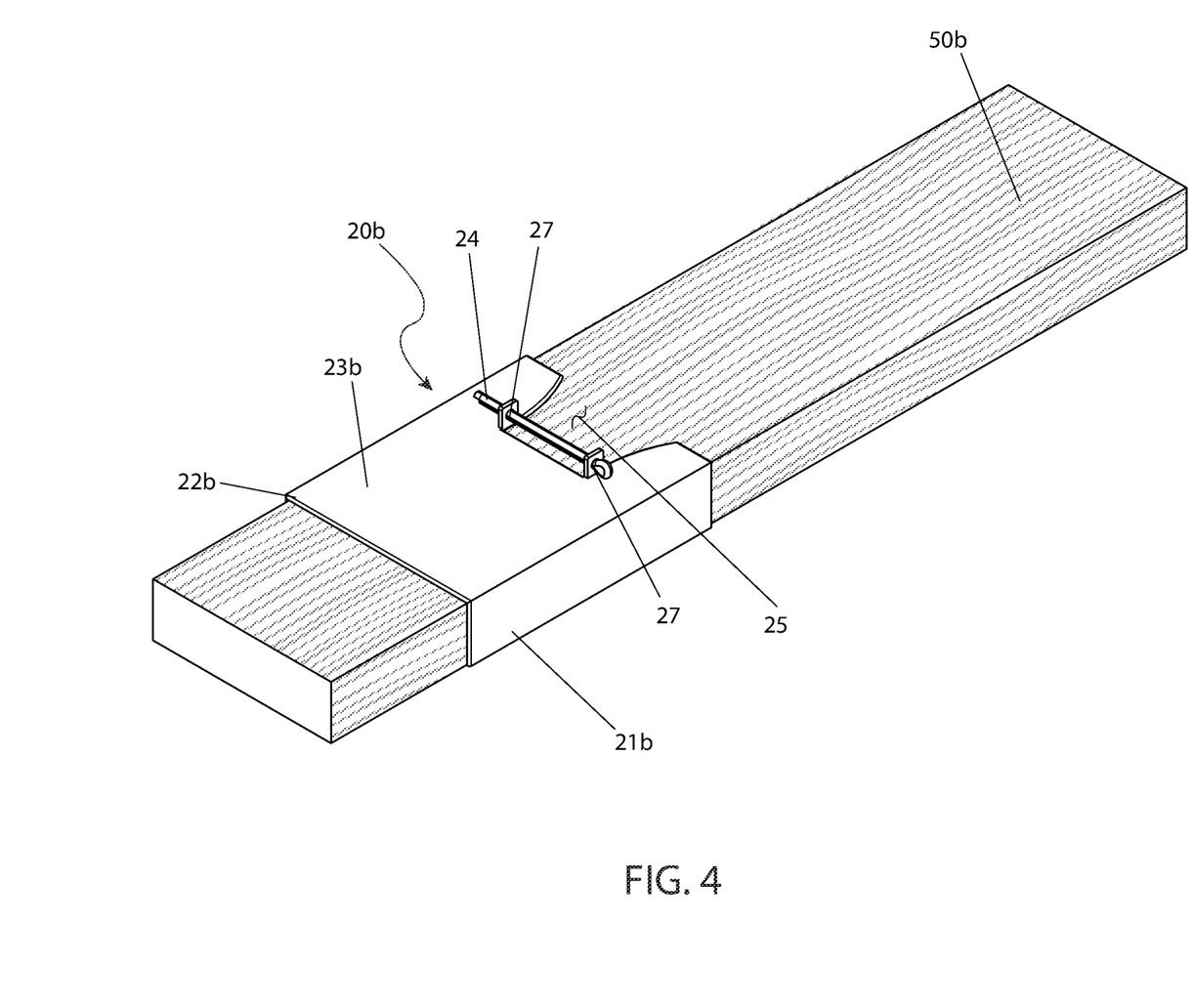
FIG. 4 is an environmental perspective view of the bracket second embodiment mounted on the second framing element with the tape holder removed, according to an alternate embodiment of the present invention.

FIG. 4 illustrates a bracket second embodiment 20b as it is installed on a second framing element 50b. The bracket second embodiment 20b includes a planar bracket second embodiment first side portion 21b and a planar bracket second embodiment second side portion 22b oriented parallel to each other and each preferably one inch (1 in.) in height. Upper edges of the bracket second embodiment first side portion 21b and bracket second embodiment second side portion 22b are conjoined by a bridging planar bracket second embodiment center portion 23b. In a preferred embodiment, the width of the bracket second embodiment center portion 23b is five-and-five-eighths inches (5⅝ in.) to accommodate the width of the second framing element 50b (e.g., a two by six inch (2×6 in.) framing element is typically approximately five-and-half inches (5½ wide). A center front portion of the bracket second embodiment center portion 23b includes a slot 25 sized to permit pivoting motion of the tape holder 30 when it is attached to the bracket second embodiment 20b. Upstanding from an upper portion of the rear corners of the slot 25 are a pair of mounting ears 27. Each mounting ear 27 has an aperture to permit the passage of a pin 24 therethrough. The pin 24 is intended to removably mount the tape holder 30 to the ears 27.

Figure 5:
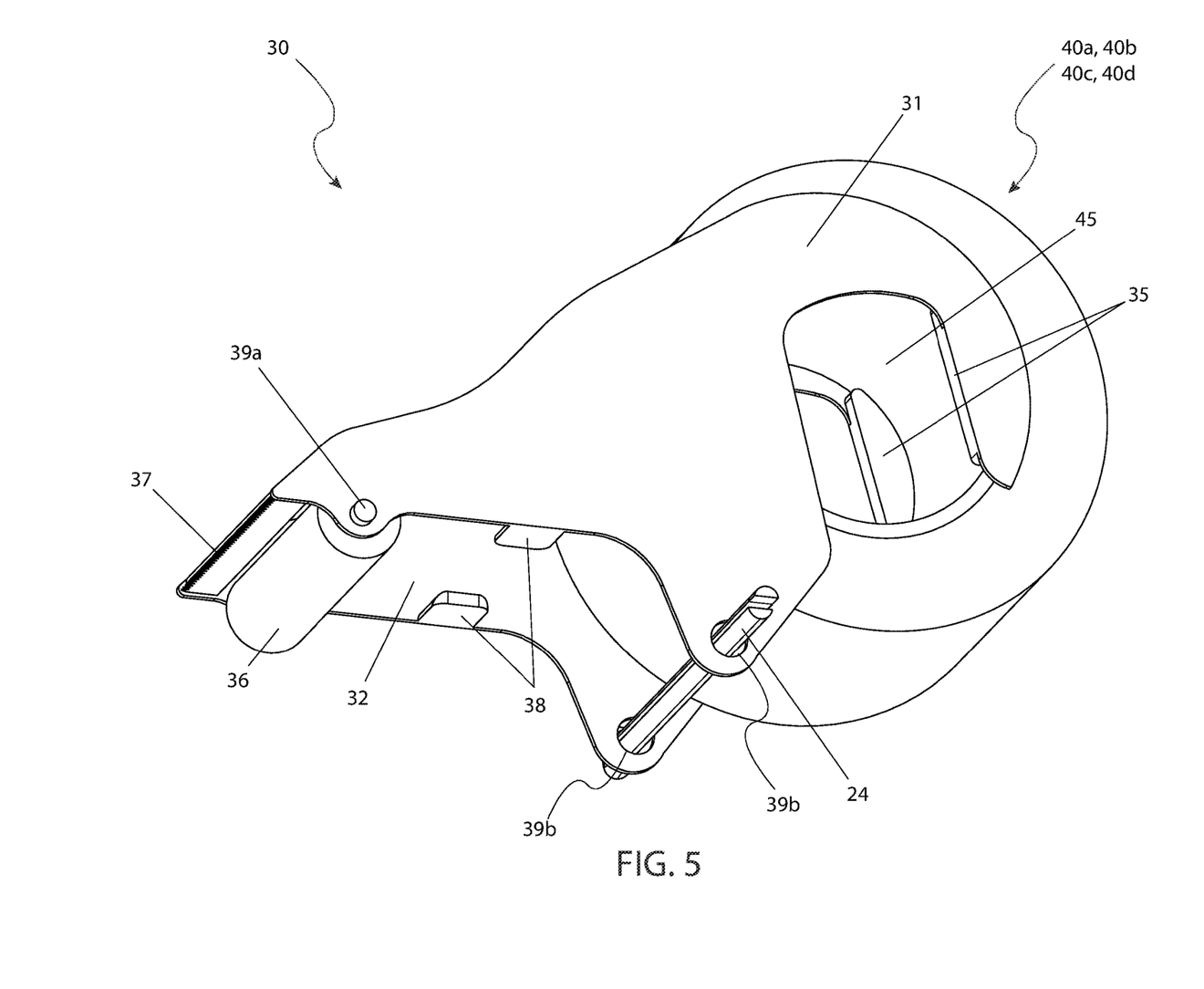
FIG. 5 is a side elevation view of the tape holder, according to the preferred embodiment of the present invention.

FIG. 5 illustrates a rear perspective view of the tape holder 30. The tape holder 30 includes a holder front portion 33 having a first side and a second side, a holder first side portion 31 extending rearwardly and perpendicularly away from the first side of the holder front portion 33, and a holder second side portion 32 extending rearwardly and perpendicularly away from the second side of the holder front portion 33. The holder first side portion 31 and holder second side portion 32 are preferably identical in shape and oriented parallel with each other. Each holder first side portion 31 and holder second side portion 32 has a flange 35 that perpendicularly extends inward for approximately one-half inch (½ in.). A reel 45 is rotatably mounted to the flanges 35 so as to be oriented between the holder first side portion 31 and holder second side portion 32 and located at the rear top thereof. A tape 40a, 40b, 40c, 40d in a rolled configuration is disposed on the reel 45 and is dispensed therefrom. The holder front portion 33 has at least one (1) window 34 stamped out or otherwise formed therefrom, enabling visual identification of a remainder amount of the tape 40a, 40b, 40c, 40d.

Located at the terminal front bottom and attached to the holder first side portion 31 and holder second side portion 32 is a cutter 37 for tearing the tape 40a, 40b, 40c, 40d. Rotatably attached to front apertures 39a of the holder first side portion 31 and holder second side portion 32, located towards the front and on the bottom, immediately rearward from the cutter 37, is a roller 36 to help advance and flatten the tape 40a, 40b, 40c, 40d as it is being dispensed. Located immediately rearward of the roller 36 are a pair of tabs 38, each aligned with each other and extending inwardly from the holder first side portion 31 and holder second side portion 32. The tabs 38 further assist in the guiding of the tape 40a, 40b, 40c, 40d towards the roller 36 and cutter 37. Located on the bottoms of the holder first side portion 31 and holder second side portion 32, subjacent to the reel 45, are a pair of vertically-aligned rear apertures 39b. The rear apertures 39b are capable of receiving the pin 24 when the tape holder 30 is mounted to the ears 27 of either bracket embodiment 20a, 20b.

Figures 6A, 6B:
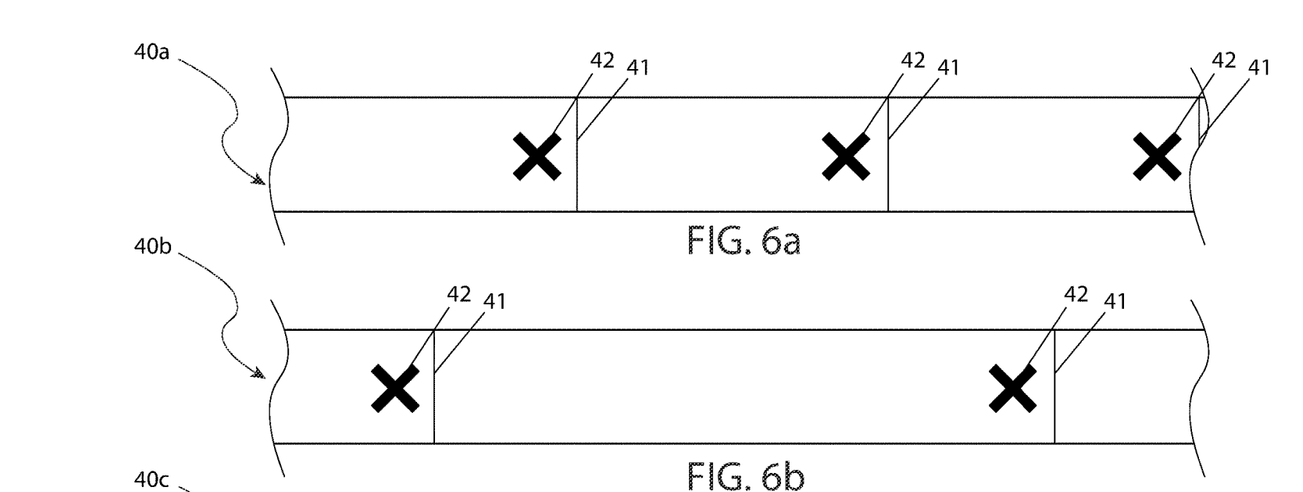
FIG. 6*a* is a top plan view of a portion of a tape first embodiment.
FIG. 6*b* is a top plan view of a portion of a tape second embodiment.

FIG. 6a illustrates a tape first embodiment 40a that is provided in a rolled configuration and mounted on the reel 45. The tape first embodiment 40a has a width configured to fit on the reel 45 of the tape holder 30 and a material able to be cut by the cutter 37. The tape first embodiment 40a has a plurality of first tape marks 41 equidistantly spaced, similar to common markings necessary for constructing roofing elements. Such a first tape mark 41 can be a line perpendicularly positioned on the tape first embodiment 40a and spaced sixteen inches (16 in.) apart. A plurality of second tape marks 42, each herein depicted as an "X", is each placed adjacent to an individual first tape mark 41, always on the same side. As such the second tape marks 42 are similarly equidistantly-spaced.

FIG. 6b illustrates a tape second embodiment 40b that is provided in a rolled configuration and mounted on the reel 45. The tape second embodiment 40b has a width configured to fit on the reel 45 of the tape holder 30 and a material able to be cut by the cutter 37. The tape second embodiment 40a has a plurality of first tape marks 41 equidistantly spaced, similar to common markings necessary for constructing roofing elements. Such a first tape mark 41 can be a line perpendicularly positioned on the tape second embodiment 40a and spaced twenty-four inches (24 in.) apart. A plurality of second tape marks 42, each herein depicted as an "X", is each placed adjacent to an individual first tape mark 41, always on the same side. As such the second tape marks 42 are similarly equidistantly-spaced.

Figures 6C, 6D:
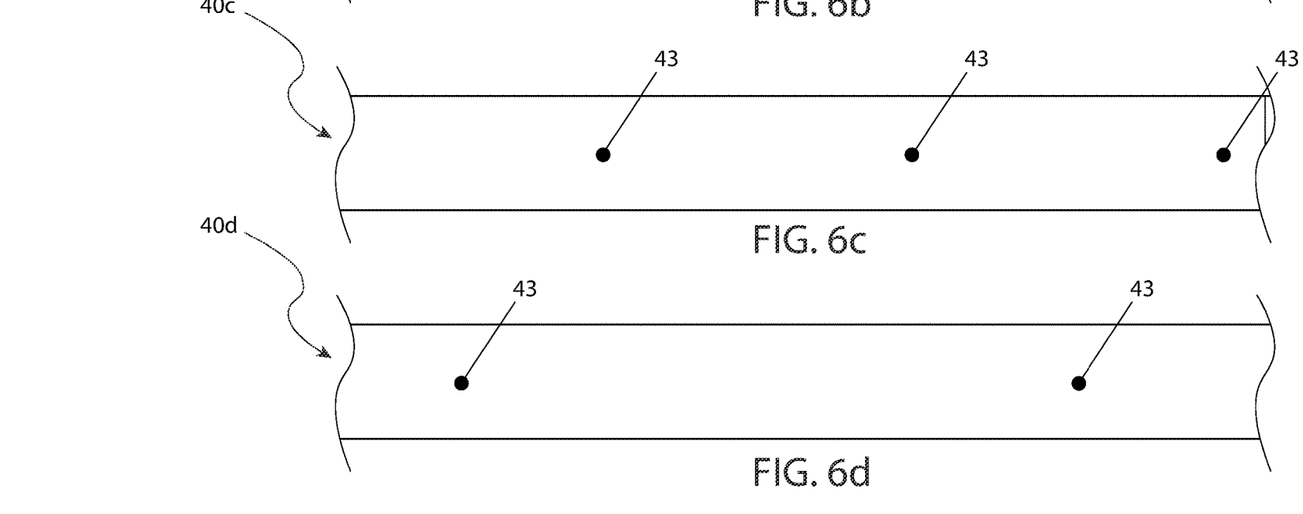
FIG. 6c is a top plan view of a portion of a tape third embodiment.
FIG. 6d is a top plan view of a portion of a tape fourth embodiment.

FIG. 6c illustrates a tape third embodiment 40c that is provided in a rolled configuration and mounted on the reel 45. The tape third embodiment 40c has a width configured to fit on the reel 45 of the tape holder 30 and a material able to be cut by the cutter 37. The tape third embodiment 40c has a plurality of third tape marks 43 equidistantly spaced, similar to common markings necessary for hanging material on a vertical surface. Such a third tape mark 43 can be a dot centrally positioned on the tape third embodiment 40c and spaced sixteen inches (16 in.) apart.

FIG. 6d illustrates a tape fourth embodiment 40d that is provided in a rolled configuration and mounted on the reel 45. The tape fourth embodiment 40d has a width configured to fit on the reel 45 of the tape holder 30 and a material able to be cut by the cutter 37. The tape fourth embodiment 40d has a plurality of third tape marks 43 equidistantly spaced, similar to common markings necessary for hanging material on a vertical surface. Such a third tape mark 43 can be a dot centrally positioned on the tape fourth embodiment 40d and spaced twenty-four inches (24 in.) apart.

It is appreciated that any grade, size, or tackiness of tape 40a, 40b, 40c, 40d that is used in any of the embodiments can be suitable for the present invention. This includes masking tape, duct tape, strapping tape, or any other type of tape 40a, 40b, 40c, 40d that can be job specific, particularly dependent on the type of framing element 50a, 50b or substrate the tape 40a, 40b, 40c, 40d is to be used upon. It is also appreciated that the bracket embodiments 20a, 20b can be manufactured in any particular size that is commonly associated with framing elements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A measurement system, comprising:
a tape holder having a holder front portion with a first side and a second side, a holder first side portion extending rearwardly and perpendicularly away from the first side of the holder front portion, and a holder second side portion extending rearwardly and perpendicularly away from the second side of the holder front portion;
a framing element having a bracket with a plurality of upper edges, the tape holder is mounted on the bracket of the framing element;
a reel of tape disposed on the tape holder, the reel of tape includes a tape dispersed from the reel of tape onto the framing element;
a cutter tearing the tape, the cutter is disposed at a terminal front bottom and attached to the holder first side portion and the holder second side portion;
a roller rotatably attached to a plurality of front apertures disposed on the holder first side portion and the holder second side portion to help advance and flatten the tape as it is being dispensed; and
a pair of tabs disposed immediately rearward of the roller, each of the pair of tabs are aligned with each other and extending inwardly from the holder first side portion and the holder second side portion.

2. The measurement system, according to claim 1, wherein the holder front portion has at least one window enabling visual identification of a remainder amount of the tape.

3. The measurement system, according to claim 1, wherein the holder first side portion and the holder second side portion are identical in shape and oriented parallel with each other.

4. The measurement system, according to claim 1, wherein each of the holder first side portion and the holder second side portion has a flange that perpendicularly extends inward.

5. The measurement system, according to claim 1, wherein the tape holder and the bracket are each separate and interlocking.

6. The measurement system, according to claim 1, wherein the tape holder is made out of an inert and resilient material.

7. The measurement system, according to claim 1, wherein the tape holder is made out of a material to withstand repeated uses selected from the group consisting of plastic, stainless steel, or aluminum.

8. The measurement system, according to claim 1, wherein the framing element is 2 inches high and 4 inches wide.

9. The measurement system, according to claim 1, wherein the framing element is 2 inches high and 6 inches wide.

10. The measurement system, according to claim 1, wherein the width of the bracket is five-and-five-eighths inches.

11. The measurement system, according to claim 1, wherein the upper edges are conjoined by a bridging planar bracket first embodiment center portion.

12. The measurement system, according to claim 1, wherein a center front portion of the bracket includes a slot sized to permit pivoting motion of the tape holder when it is attached to the bracket.

13. The measurement system, according to claim 12, wherein upstanding from an upper portion of the rear corners of the slot are a pair of mounting ears.

14. The measurement system, according to claim 13, wherein each of the pair of mounting ears have an aperture to permit the passage of a pin therethrough.

15. The measurement system, according to claim 14, wherein the pin is intended to removably mount the tape holder to the ears.

16. The measurement system, according to claim 1, wherein the reel is rotatably mounted to the flanges oriented between the holder first side portion and the holder second side portion and located at the rear top thereof.

17. The measurement system, according to claim 1, wherein the pair of tabs assist in guiding the tape towards the roller and the cutter.

18. The measurement system, according to claim 1, further comprising a pair of vertically-aligned rear apertures located on a bottom of the holder first side portion and the holder second side portion, subjacent to the reel.

19. The measurement system, according to claim 18, wherein the rear apertures receive the pin when the tape holder is mounted to the ears of either bracket embodiment.

\* \* \* \* \*